United States Patent [19]

Lee

[11] Patent Number: 4,848,891

[45] Date of Patent: Jul. 18, 1989

[54] TEMPLE BIASING MEANS

[76] Inventor: Eugene Lee, 607 Campbell St., Macomb, Ill. 61455

[21] Appl. No.: 286,180

[22] Filed: Dec. 19, 1988

[51] Int. Cl.⁴ .......................... G02C 5/16; G02C 5/14
[52] U.S. Cl. .................................. 351/113; 351/114; 351/119
[58] Field of Search ................ 351/113, 114, 119, 120

[56] References Cited

U.S. PATENT DOCUMENTS 3,479,110  11/1989  Fromm .

Primary Examiner—Rodney B. Bovernick
Attorney, Agent, or Firm—Joseph W. Holloway

[57] ABSTRACT

A spring connected, two-part eyeglass temple shaft together with an operating sleeve which reciprocates longitudinally with respect to the temple shaft for flexing the spring and forcing the rear temple part against the wearer's head and for releasing the spring which then restores the original alignment of the temple parts. The sleeve also provides a rigid structural bridge between the temple parts.

18 Claims, 2 Drawing Sheets

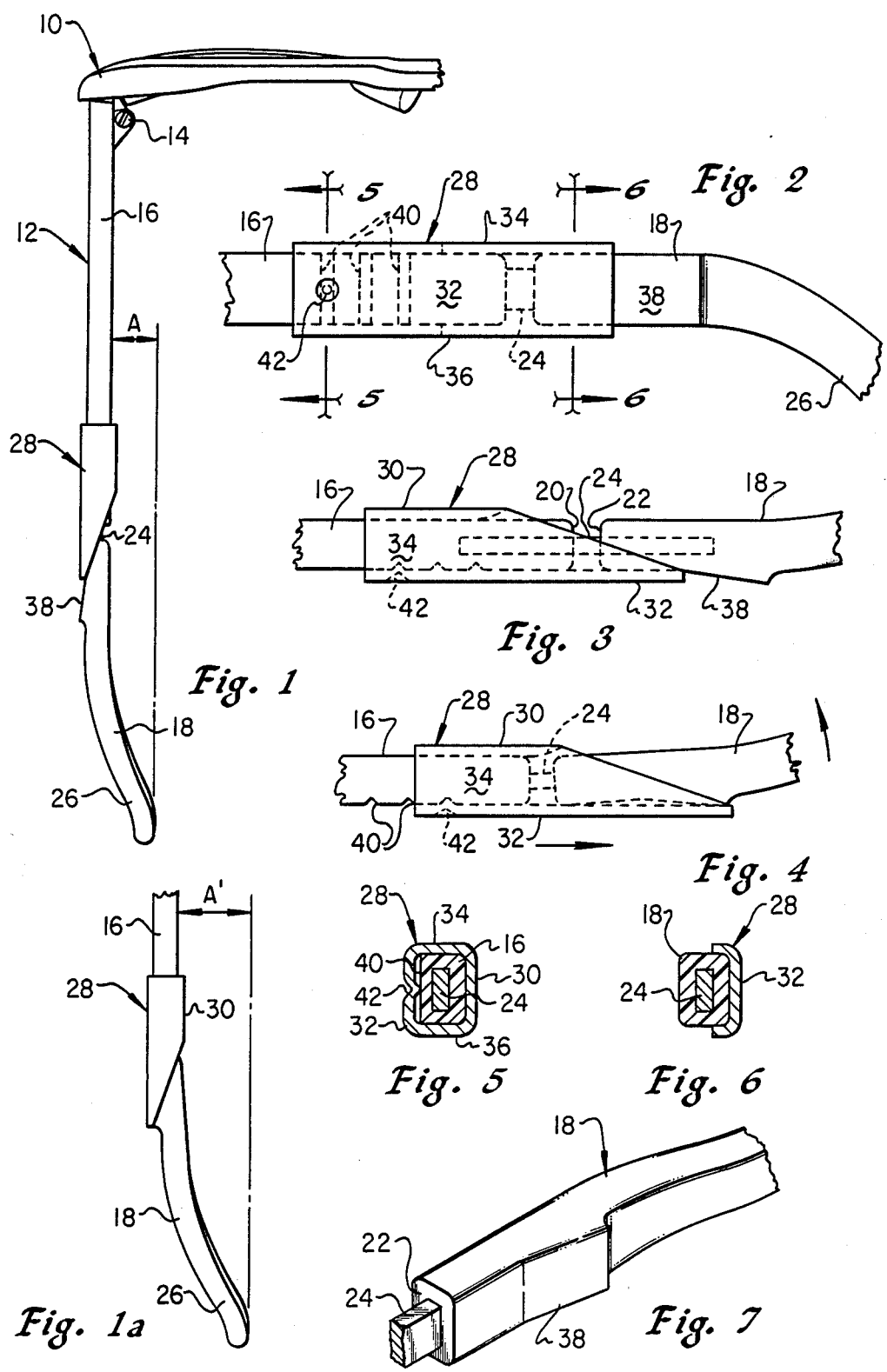

TEMPLE BIASING MEANS

BACKGROUND OF THE INVENTION

This invention generally pertains to frames for all types of eyewear such as vision-correcting eyeglasses, sunglasses, safety glasses and the like. More particularly, this invention is directed to improved temple portions of such frames wherein the bias, hence the pressure, exerted by the temple against the wearer's head may be selectively varied as required to maintain the frame in proper position.

In accordance with conventional eyewear construction, the forward ends of the temples or sidepieces are hinged to the outboard sides of a lens-receiving section of the frame thereby permitting the temples to fold flat against the back of the frame. The temples swing apart sufficiently to permit placement of the frame on the wearer's head so that the lens-receiving section rests on the bridge of the nose and the free ends of the temples extend backwardly above the ears and press against the head.

Eyewear temples are fabricated of many light weight materials such as plastic or metal or a combination thereof. Usually the temples of vision-correcting eyeglasses are somewhat flexible and may be permanently deformed by heating and bending as an incident to professional fitting of frames to individual wearers. Ideally, the temples are fit for general conformity with the sides of the wearer's head while exerting a comfortably light pressure thereon which is sufficient to maintain the frame and the lenses in the optically correct relationship with the wearer's eyes. However, most wearers of corrective eyeglasses find that, after a period of normal usage, the temples spread apart or become sprung due to deformation of the temples or wearing or loosening of the hinges, or both, whereby the optimum fitted pressure between the head and the temples is diminished. In this instance, the frame will slip forwardly and downwardly along the nose causing the wearer to reposition the frame on the bridge of the nose in a repetitious manner. Such unwanted frame slippage relative to the head irritates the underlying skin and causes eye strain due to periodic actuation of eye focusing muscles in response to the movement of the lenses in front of the eyes.

The aforementioned problems attending frame slippage are exacerbated in the event that the wearer must lean forwardly and downwardly to perform certain tasks and where head movements are started and stopped in a rapid, jerky fashion as, for example, during certain athletic activities.

Eyewear which comprise off-the-shelf articles rather than professionally fitted prescription glasses usually exhibit poorly fitting temples causing considerable slippage and dislocation. This is generally the case with special purpose, non-corrective eyewear which is worn on an as-needed basis to protect the wearer's eyes form outdoor sunlight or from various hazardous conditions found in industrial plants and the like. Even should a choice of sizes be available, wearers of relatively inexpensive sunglasses and temporary safety glasses required in hazardous work areas generally experience temple-to-head pressures which fail to keep the eyewear consistantly in place or which compresses the wearer's head in an uncomfortable manner.

Heretofore it has been proposed to attach a spring device to the frame structure for biasing the temples relative to the lens-carrying portion of the frame in a manner which will urge the temples to pivot about their hinges toward their folded position. The general purpose of such spring biasing means is to create pressure between the temples and the head whereby such pressure in new eyewear automatically adjusts the temples to the head for a good fit or whereby enhanced temple pressure is provided for old eyewear to offset the loss of such pressure due to hinge wear or temple deformation. U.S. Pat. No. 3,923,384 issued on Dec. 2, 1975 to Leblanc discloses a leaf spring biasing means riveted to the temple of the frame wherein the spring coacts with the adjacent corner of the lens bearing portion of the frame to flex the spring as the temples are pivoted toward their open position. Leblanc claims that such spreading and spring flexure produce a reactive force which provides a pressure fit of the temples against the head of the wearer. Similar auxiliary means for spring loading eyewear temples in response to spreading the temples are proposed in U.S. Pat. No. 3,600,068 issued on August, 1971 to Jolicoeur and U.S. Pat. No. 3,654,376 issued Apr. 4, 1972 to Lyons. However, none of these prior art biasing devices provides for wearer adjustment of the temple pressure against the head in the event that the initial spring force fails to produce an acceptable temple-to-head fit or should such auxiliary spring force diminish or become inconsistant due to wearing or bending of the spring component and coacting parts of the frame. Thus this approach to the problem of eyewear slippage appears to be incomplete and, at best, provides only a temporary solution.

Another undesirable limitation of nonadjustable temple biasing means is that the wearer cannot vary selectively the pressure of the temples against the head as needed to meet changing levels or degrees of head motion and acceleration. For example, the need to increase quite substantially temple pressure may arise only during sporadic periods of wearer activity involving rapid or violent head movement which tends to dislodge his eyewear frames. When such activities cease, it is desirable that the temple pressure be readily abated to a point where the temples are held securely against the head without being uncomfortably tight. This advantageous characteristic of eyewear temples would be appreciated by workers who encounter unavoidable head vibration and by athletes during such activities as tennis, basketball and the like.

U.S. Pat. No. 3,479,110 issued Nov. 18, 1969 to Fromm and U.S. Pat. No. 4,204,749 issued May 27, 1980 to Davis propose adjustable auxiliary means for urging eyewear temples into contact with the wearer's head.

Davis shows a pair of structurally complex braces hinged to the lens-carrying portion of the frame. The braces mount protruding thumbscrews which are in bearing contact with the temples. By selectively rotating the thumbscrews, threaded shanks of the same thrust against coacting temples to bias them toward the wearer's head. Davis states that, with the eyeglasses in place, the wearer can adjust the thumbscrews, hence the pressure of the temples against his head, with precision and without the assistance of an optician.

Fromm discloses temples in which the downturned free ends located behind the ears are split to form inner and outer leaves, the outer leaf being relatively rigid and the inner leaf is flexible and adjustable with respect to the outer leaf to press against the wearers head when a wedging ring slidably carried by the outer leaf is pushed therealong to cause deflection of the inner leaf. Fromm states that his temple modification provides adjustable pressure but eliminates the need to bend the temple as a whole and also eliminates the constant pressure created by deforming the temples so as to bear against the wearer's head.

While the aforedescribed auxiliary temple biasing devices suggested by Davis and Fromm display a degree of adjustability, both depend entirely on the resilience of the temple material per se to flex the temple away from the head when the user desires to reduce the temple-to-head pressure for any of the reasons mentioned hereinabove. It is believed that such alternate bending and staightening of conventionally constructed eyewear temples could lead to permanent deformation or even early breakage.

Other disadvantages features of the Davis and Fromm devices are that both the Davis thumbscrew and the Fromm adjusting ring are completely separable from their frames and could be easily lost or misplaced. Both devices produce additional catch points for the wearer's hair and the adjusting means of both detract from the aesthetic appearance of their respective temples.

In general and in the cases of the abovementioned devices in particular, temple biasing means tend to comprise various devices and mechanisms which are auxiliary to and mounted upon the temples and/or the lens-carrying portion of the eyewear frames. This tendency of the prior art to add on expedient structure to conventional temples tends to produce a final article which is generally make-shift in function and appearance.

SUMMARY OF THE INVENTION

Accordingly, it is the general object of this invention to provide a temple biasing means which is structurally and operationally adapted to obviate the aforedescribed shortcomings of the prior art devices presently utilized for this purpose.

A principal objective is to provide an improved temple biasing means comprising an integral part of the temple itself rather than being attached to the temple as an add-on or expedient. To this end, this invention contemplates a two-piece temple wherein front and rear portions thereof are separate but are structurally joined by a flexible member, such as a flat spring, to which the longitudinally juxtaposed ends of the portions are molded or are otherwise permanently attached. The spring member permits lateral flexing of the rear temple portion with respect to the side of the wearer's head in response to wearer controlled movement of a longitudinally movable slide carried on the front temple portion. The rear temple portion has a camming surface formed thereon which coacts with the slide either to flex or to release the spring member; and, the slide additionally functions to provide a rigid structural joint between the front and rear portions of the temple.

Anoter important object of this invention is to provide a flexibly connected, two-part temple shaft together with an operating means for flexing the rear temple part toward the wearer's head for adjusting the bearing pressure of the rear temple part against the head and for releasing the flexing means altogether so that the original alignment of the temple parts as well as the original temple pressure is restored. An important part of this invention resides in the operating means for accomplishing these three functions by a simple sleeve which shifts longitudinally with respect to the temple portions and continuously interconnects the same.

A particularly advantageous aspect of this invention is the use of a spring member to connect the separate temple parts in an articulated fashion. Not only are the front temple portion and the temple hinge substantially isolated by the spring from the bending force applied to the rear temple portion, but the spring itself serves the dual functions of securing the temple parts against longitudinal displacement and of resiliently restoring their original longitudinal alignment when the bending force applied to the rear temple portion is released.

Other important objects of this invention are to provide improved temple biasing and adjusting means which are not detachable from the temple, do not provide significant catch points for the wearer's head, are structurally simple and therefore low in cost, are in general conformity with the configuration of the temples, and do not detract from the aesthetic apperance of the eyewear with which they are utilized.

These and other advantages and objects of this invention and the manner of obtaining them will become apparent and the invention will be best appreciated and fully understood by having reference to the following detailed description of the embodiments of the invention taken in conjunction with the accompanying drawings.

BRIEF DESCRIPTION OF THE DRAWINGS

FIG. 1 is a fragmentary top plan view showing the temple biasing means in its inoperative condition;

FIG. 1a is a fragmentary view similar to FIG. 1 wherein the biasing means is shown in its fully operated condition;

FIG. 2 is a fragmentary side view of the temple biasing shown in FIG. 1;

FIG. 3 is a fragmentary top plan view of the temple biasing means shown in the inoperative condition as in FIG. 1;

FIG. 4 is a fragmentary top plan view of the temple biasing means in the fully operated condition as shown in FIG. 1a;

FIG. 5 is a section taken along lines 5—5 of FIG. 2;

FIG. 6 is a section taken along lines 6—6 of FIG. 2;

FIG. 7 is a fragmentary perspective view of the rear portion of an articulated temple shown in FIGS. 1-4;

DETAILED DESCRIPTION OF THE INVENTION

Figure 8:
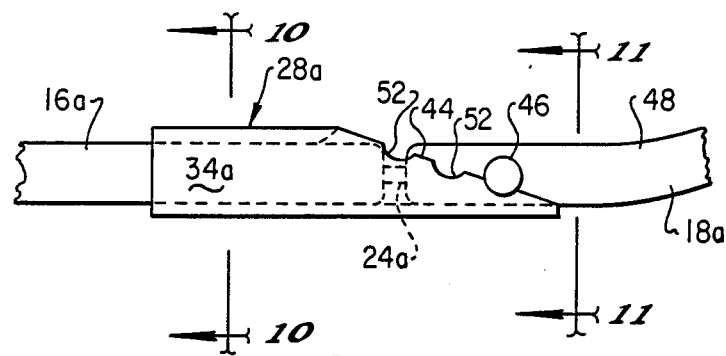
FIG. 8 is a view similar to FIG. 3 showing a fragmentary top plan view of an alternate embodiment of the invention.

While the improved temple biasing means according to this invention is usable with a variety of types of eyewear, the drawings depict a common style of vision-correcting eyeglasses generally comprising a lens-carrying frontal frame 10 having temples, one of which is indicated in its entirety by numeral 12, which are swingably attached at their forward ends to the frame 10 by hinges 14. The temples extend rearwardly to either side of the wearer's head when in use and may be folded about hinges 14 against the rear face of the lens frame 10 for storage in a case or the like.

While the temples of conventional eyeglass generally comprise a one-piece shaft, the temple 12 comprises discrete front and rear portions indicated by numerals 16 and 18, respectively. The front portion 16 extends from the area of hinge 14 to a transverse rear terminal suface 20 which faces a forward terminal surface 22 on the rear temple portion 18. The opposed terminal surfaces 20 and 22 are longitudinally spaced a distance which is determined in a manner to be explained hereinafter.

An important feature of this invention is the provision of a flexible member 24, such as a flat spring shown in FIGS. 2-4, which structurally connects the juxtaposed ends of temple portions 16 and 18 in an articulated relationship. While the flexible member 24 may be fixed to the temple portions in other ways, a preferred connection is made by coaxially molding the member 24 interiorly of the temples which are preferably made of tough yet flexible plastic material. As best seen in FIG. 3, the spring 24 has oppositely extending portions which longitudinally penetrate a relatively short distance into the front and rear temple portions 16 and 18. In some cases, it may be desirable to extend the spring forwardly to or proximate the hinge 14 and rearwardly into the downturned free end of the rear temple portion 18 for the purpose of reinforcing the temples and providing temple resiliency.

In the illustrative embodiments of the invention, the cross sectional configurations of the front and rear portions 16 and 18 proximate the exposed surfaces 20 and 22 as well as that of the spring 24 are rectangular; however, the cross sectional shape and size of temple 12 and the spring 24 may be substantially varied to suit changes in the style and function of the eyewear and the materials employed. The spring must exhibit sufficient strength and resiliency to withstand repetitious flexing of the rear temple portion 18 with respect to the relatively fixed front portion 16. The rear temple portion includes a downwardly bent segment 26 which projects laterally inwardly toward the wearer's head. The range of lateral traverse of rear portion 18 is indicated by a comparison of the dimensions A and A' in FIGS. 1 and 1a which respectively depict the spring 24 in its relaxed and flexed conditions.

The operating means by which the wearer may flex the spring 24 generally comprises a hollow or tubular member 28 slidably carried for reciprocating movement upon the temple portions 16 and 18. The illustrated operating slide has inboard and outboard walls 30 and 32, respectively, and upper and lower walls 34 and 36, respectively, which closely surround the flat outer surface of the temple portions 16 and 18, as shown in FIGS. 5 and 6. The longitudinal dimension of the inboard wall 30 is made considerably less than that of the outboard wall 32; therefore, the extreme rear edges of the upper and lower walls 34 and 36 slope, as seen in FIG. 3, from their intersections with the inboard wall 30 to their intersections with the outboard wall 32. The purpose of this sloped configuration, is to situate the opening of the rear end of the hollow slide member 28 at an angle to its longitudinal centerline and facing toward the wearer's head whereby the rear portion 18 of the temple can be laterally displaced from the open side of slide 28 seen in FIG. 6 even when the slide is operated to its extreme rearward position shown in FIG. 4.

One function of the slide member 28 is to alternately flex and release the spring 24 either to increase or decrease the pressure exerted against the wearer's head by the rear temple portion 18. This is achieved by the coaction of the rearmost portion of the inside surface of the slide wall 32 with a cam surface 38 formed on the outboard side of the rear temple portion 18 and best shown in FIGS. 3 and 7. With the slide 28 just out of contact with the cam surface 38, as shown in FIG. 3, the spring 24 is relaxed and the proximate ends of temple portions 6 and 18 are in substantial longitudinal alignment. When the slide 28 is moved rearwardly, as indicated by the arrow below the slide of FIG. 4, the outer slide wall 32 will override the cam surface 38 causing the spring 24 to flex as the rear temple portion 18 is cammed inwardly in the direction indicated by the arrow at the right side of FIG. 4. When the slide 28 is moved forwardly, the energy stored in the spring 24 is released. As a result, the rear temple portion 18 is swung into substantial alignment with the front temple portion 16; and, the thrust of the rear temple against the wearer's head is reduced or eliminated.

It will be understood that the spring member of this invention is not intended to bias the rear temple portion toward the wearer's head. Instead, this function is achieved by the positive camming coaction of the slide member 28 and the cam surface 38. The functions of the spring 28 are to connect structurally the temple portions for flexural articulation, as described above, and to provide spring loading for biasing the rear temple portion to its relaxed or normal condition. It is the slide member 28 which bears upon the cam surface of the rear temple portion thereby producing mechanically amplified torque which, in turn, causes spring flexure and angular displacement of the rear portion 18 toward the wearer's head. Even should the spring bend or become somewhat weaker over time, the positive camming action which creates temple-to-head pressure will not be adversely effected.

An important feature of this invention is the provision of means of adjusting the temple-to-head pressure created by operation of the slide member in the manner just described. The overall range of such adjustment is established by the designed height of rise of the camming surface 36. If the rise of the cam 38 is increased, the range of variation in pressure of the rear temple portion 18 against the wearer's head will increase. Stated otherwise, the difference between dimensions A and A' shown in FIGS. 1 and 1a, respectively, will increase if the cam rise is increased. The required range of temple adjustment may be relatively small in order to correct loosening of ordinary perscription eyeglasses which are professionally fitted to the wearer. However, the preferred range of adjustment may be substantial in the case of single-sized safety glasses intended for temporary use by visitors to hazardous industrial work areas. Likewise, a wide variation between minimum and maximum temple pressures may be highly desirable for wearers who experience violent but sporadic head motion so that a tight fit is available on an as-needed basis but can be relaxed when normal head motion is resumed.

The ease with which the slide operator 28 can be shifted rearwardly to cam the rear temple portion 18 toward the wearer's head is in part determined by the stiffness of that segment of spring 24 which connects the temple portions 16 and 18. For a given spring material, the stiffness of the spring is directly related to the length and cross sectional configuration of the interconnecting spring segment. The minimum spring length hence the minimum spacing between surfaces 20 and 22 must be great enough to avoid interference therebetween when the spring 24 is fully flexed by the cam 38.

An important secondary function of the slide member 28 is the maintenance of vertical alignment between the front and rear temple portions 16 and 18 even though provision of the aforedescribed camming function of the slide requires it to reciprocate telescopically with respect to the temple portions. The slide member provides such vertical support by continuously bridging the space between the temple end surfaces 20 and 22 since both the upper and lower slide walls 34 and 36 remain in bearing contact with juxtaposed surfaces of the temple portions 16 and 18. This secondary supporting and aligning function of slide member 28 is particularly important where the cross sectional area of the spring member 24 may be relatively small and the spring is apt to be bent or twisted in an unwanted manner.

Plural slots 40 vertically relieved in the outboard side of each forward temple portion 16 adjacent the end surface 20 selectively coact with a single dent or dimple 42 projecting inwardly adjacent the front end of the slide surface 32 to provide an adjustable detent between the slide 28 and the front temple portion 16. The material from which either the front temple portion 16, the slide member 28 or both, is made is sufficiently elastically deformable to permit shifting of the slide 28 along the temple so that the dimple 42 will register with any one of the slots 40 selected by the wearer. With this detent mechanism, the wearer may incrementally adjust the longitudinal position of the slide 28 with respect to the camming surface 38 hence the pressure exerted laterally by the rear temple portion against the head. The number of steps between minimum and maximum temple pressure, shown in FIGS. 3 and 4, respectively, can be increased as desired by lengthing the front to back dimension of the camming surface 38 and providing a greater number of detent slots 40.

So long as the detent mechanism is engaged, i.e. the dimple 42 is received in one of the slots 40, the slide 28 will be captured on the front temple portion 6. Since the inside dimensions of the slide member will not permit it to slide over the highest point of the cam surface 38, the slide cannot become completely separated from the temple 10 and inadvertently lost. The force required to shift the slide member from one detented position to another is preferably made great enough to prevent accidental shifting, but light enough so a wearer of any age can quickly and easily digitally adjust the pressure exerted by the rear temple portion while the eyewear is in place on his head.

Figure 11:
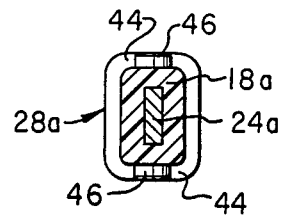
FIG. 11 is a section taken along lines 11—11 of FIG. 8.
Figure 12:
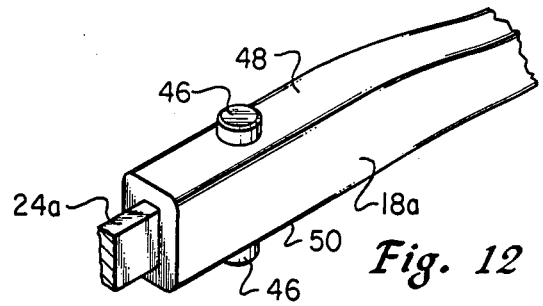
FIG. 12 is a perspective view of the rear portion of an articulated temple shown in FIGS. 8 and 9.

FIGS. 8-12 illustrate an alternate embodiment of the invention. As in the previously described embodiment, an eyeglass temple is split into two parts 16a and 18a which are interconnected in an articulated manner by a flexible member 24a so that the rear temple portion 18a can flex laterally toward the wearer's head in response to longitudinal shifting of a slideable operating member 28a. The prinicpal variation of this embodiment is the provision of camming surfaces 44 which are defined by the sloped rear surfaces of the upper and lower walls 34a and 36a of the slide member 28a. Coacting with the cam surfaces 44 in the nature of cam followers are a pair of cylindrical bosses or lugs 46 which project above and below the top and bottom surfaces 48 and 50 of the rear temple portion as best seen in FIGS. 11 and 12. These bosses 46 are sized to be interfittably received in detent notches 52 relieved in the upper and lower cam surfaces 44.

Figure 9:
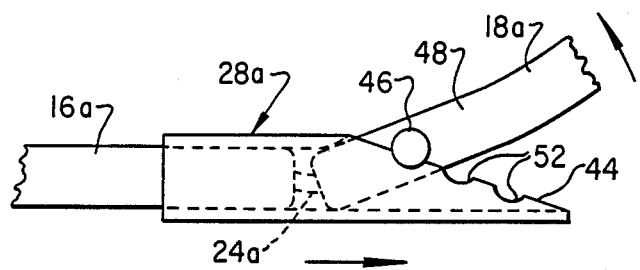
FIG. 9 is a view similar to FIG. 8 in which the alternate temple biasing means is shown in the fully operated condition.
Figure 10:
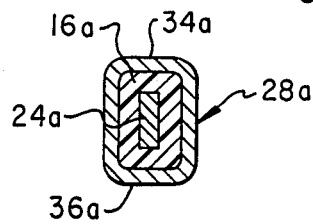
FIG. 10 is a section taken along lines 10—10 of FIG. 8.

To increase the temple-to-head pressure, the wearer shifts the modified slide 28a in the direction of the arrow below FIG. 9 to move the slide rearwardly from the position shown in FIG. 8. The cam surfaces 44 will underride the bosses 46 thereby forcing the rear temple portion 18a to move in the direction of the arrow to the right of FIG. 8 as the spring 24a is flexed. It will be appreciated that the notches 52 and bosses 44 cooperate to provide detented increments of adjustable temple bias in a manner similar to that produced by the cooperation of the slots 40 and the dimple 42 of the first described embodiment. In the first embodiment, however, the slide 28 acts as a follower of the cam surface 38 formed on the rear temple portion 18 contrary to the arrangement of the second embodiment wherein the slide 28a incorporates cam surfaces 44 and the cam following bosses 46 are located on the rear temple portion 18a.

It will be appreciated by those skilled in the eyewear art that the adjustable biasing means disclosed herein is simple yet efficient and is economical to manufacture. Also to be appreciated is the aesthetic and functional incorporation of the unobtrusive slide members the flexible members and the detent mechanisms of both embodiments into the essential structural makeup of the eyewear with which this invention may be used.

The foregoing description of the embodiments shown in the drawings are illustrative and explanatory only; and, various changes in size, shape and material as well as the specific details of the illustrated construction may be made. Therefore, I do not intend to be limited to the details shown and described herein, but intend to cover all changes and modifications which are encompassed in the scope and spirit of the appended claims.

What I claim as my invention is:

1. An eyewear temple, comprising:
front and rear temple portions joined in articulative relationship by spring means; and,
operating means movable with respect to said portions and coacting therewith for articulating said portions thereby flexing said spring means and biasing said rear portion laterally toward the head.

2. The eyewear temple defined in claim 1, wherein:
said portions are longitudinally spaced apart and are joined in end to end relationship by said spring means.

3. The eyewear temple defined in claim 2, wherein:
said spring means comprises a flat spring having opposite ends respectively attached to said temple portions.

4. The eyewear temple defined in claim 1, wherein:
said operating means is longitudinally shiftable with respect to said temple portions.

5. The eyewear temple defined in claim 4, wherein:
said operating means comprises a slide member carried by said temple portions.

6. The eyewear temple defined in claim 4, wherein:
said operating means telescopes with respect to said front temple portion.

7. The eyewear temple defined in claim 5, wherein:
said slide member bridges said temple portions.

8. The eyewear temple defined in claim 4, together with:
cam means responsive to shifting of said operating means for laterally biasing said rear temple portion.
9. The eyewear temple defined in claim 8, wherein: said cam means includes a camming surface located on said rear temple portion.
10. The eyewear temple defined in claim 8, wherein: said cam means including a camming surface located on said operating means.
11. The eyewear temple defined in claim 9, wherein said operating means bears upon said camming surface whereby shifting of said operating means relative to said camming surface laterally displaces said rear temple portion with respect to said front portion and flexes said spring means.
12. The eyewear temple defined in claim 10, together with:
boss means on said rear temple portion bearing against said camming surface whereby shifting of said operating means relative to said boss means laterally displaces said rear temple portion and flexes said spring means.
13. The eyewear temple defined in claim 4, together with:
cooperable detent elements formed on one of said temple portions and on said operating means for incrementally adjusting the longitudinal position of said operating means with respect to said temple portions.
14. The eyewear temple defined in claim 13, wherein: said detent elements comprise plural indentations on said front temple portion and a projection on said operating means.
15. The eyewear temple defined in claim 13, wherein: said detent elements comprise plural notches on said operating means and a projection on said rear temple portion.
16. In an eyewear structure including a frontal lens-bearing frame and side temples having forward ends hinged to the outboard sides of said frame, the improvement wherein each temple comprises:
front and rear temple portions having adjacent ends joined by spring means in articulating relationship;
sleeve means carried by said temple portions for longitudinal shifting with respect thereto; and,
cam means responsive to shifting of said sleeve means for urging said rear temple portion against the side of the head.
17. The eyewear structure defined in claim 16, wherein:
said cam means includes a camming surface on said rear temple portion;
said operating means is shiftable to one limiting position to engage said camming surface whereby said rear temple portion is urged laterally toward the head and said spring is flexed; and,
said operating means is shiftable to its opposite limiting position to disengage said camming surface whereby said spring means is released to bias said rear temple portion laterally away from the head.
18. The eyewear structure defined in claim 17, together with:
detent means provided by said operating means and said front temple for defining said limiting portions and at least one intermediate position for said operating means.

* * * * *